W. W. KRUTSCH.
VEHICLE WHEEL.
APPLICATION FILED MAR. 8, 1915.
1,162,080.
Patented Nov. 30, 1915.
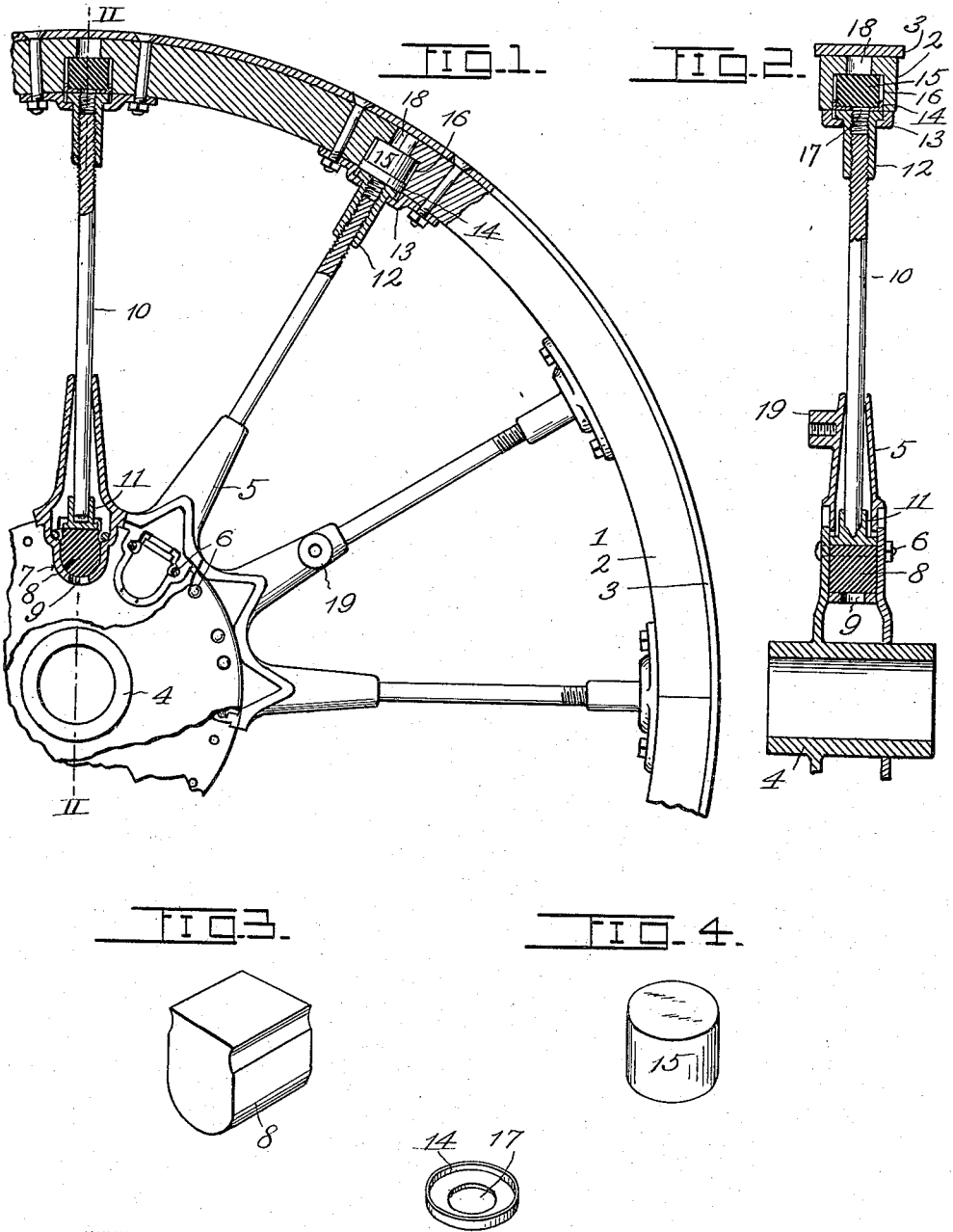
WITNESSES:
R. E. Hamilton
Fred C. Fischer
INVENTOR:
Willis W. Krutsch,
BY
F. G. Fischer,
ATTORNEY.

UNITED STATES PATENT OFFICE.

WILLIS W. KRUTSCH, OF COFFEYVILLE, KANSAS, ASSIGNOR OF ONE-HALF TO CHARLIE ALLEN WALKER, OF COFFEYVILLE, KANSAS.

VEHICLE-WHEEL.

1,162,080. Specification of Letters Patent. Patented Nov. 30, 1915.

Application filed March 8, 1915. Serial No. 13,078.

*To all whom it may concern:*

Be it known that I, WILLIS W. KRUTSCH, a citizen of the United States residing at Coffeyville, in the county of Montgomery and State of Kansas, have invented certain new and useful Improvements in Vehicle-Wheels, of which the following is a specification.

My invention relates to improvements in vehicle wheels, and the present invention pertains more particularly to the combination and arrangement of cushions and apertures for said cushions to bulge into in order to render the wheels resilient, so that they may pass over obstructions in a roadway without transmitting undue shock to the vehicle.

In the accompanying drawing: Figure 1 is a broken side elevation partly in section of a wheel constructed in accordance with my invention. Fig. 2 is a section on line II—II of Fig. 1. Fig. 3 is a detail perspective of one of a plurality of cushions arranged in the hub of the wheel. Fig. 4 is a detail perspective of one of a plurality of cushions arranged in the rim of the wheel. Fig. 5 is a detail perspective of one of a plurality of caps employed in carrying out the invention.

1 designates the rim of the wheel, which consists in the present instance of fellies 2 and a tire 3.

4 designates the hub of the wheel, to which a plurality of spoke members 5 are rigidly connected by bolts 6. The spoke members 5 have sockets 7 to receive rubber or other suitable cushions 8, said sockets having apertures 9 into which the cushions 8 may bulge when compressed.

10 designates a plurality of spoke members which extend into the spoke members 5 and have their inner ends seated in saddles 11, resting upon the cushions 8. This arrangement of the spoke members 5 and 10, renders the spokes self-adjusting, so that they may lengthen or shorten and allow the rim 1 to move up or down more or less independently of the hub 4.

The rim ends of the spoke members 10 fit into sleeves 12, which in turn fit into clips 13. The rim ends of the sleeves 12 bear against caps 14, which in turn bear against rubber or other suitable cushions 15, arranged in recesses 16, in the fellies 2. The caps 14 have apertures 17 and the fellies 2 have apertures 18 into which the cushions 15 may bulge when subjected to compressive stresses.

Certain of the spoke members 5 have laterally projecting lugs 19, to which a brake wheel (not shown) may be secured.

With the foregoing arrangement, it is apparent that when the rim of the wheel passes over an obstruction the spokes at the lower half of the hub 4 are contracted and compress their respective cushions 8 and 15, due to the resistance offered by the load on the hub. Hence the latter will not move up as high as the rim and consequently undue shock will not be imparted to the vehicle. Compression of the cushions is materially assisted by the recesses 9 and 18 in the sockets 7 and the fellies 2, respectively, into which their respective cushions are free to bulge. The openings in the caps 14, allow further bulging of the cushions 15, when compressed.

From the foregoing description, it is apparent that I have produced a wheel possessing sufficient resiliency to more or less absorb shocks from passing over obstructions in the roadway, and consequently the life of the wheels and the vehicle will be prolonged and the comfort of riding in the vehicle greatly enhanced.

Having thus described my invention, what I claim and desire to secure by Letters Patent is:

In combination, a vehicle wheel rim having recesses and apertures communicating with said recesses, cushions located in said recesses and capable of bulging into the apertures, a hub, self-adjusting plural member spokes connecting the rim and said hub, certain members of said spokes having sockets with apertures at their hub ends, and cushions located in said sockets and capable of bulging into the socket apertures, substantially as described.

In testimony whereof I affix my signature, in the presence of two witnesses.

WILLIS W. KRUTSCH.

Witnesses:
F. G. FISCHER,
L. J. FISCHER.

Copies of this patent may be obtained for five cents each, by addressing the "Commissioner of Patents, Washington, D. C."